(12) United States Patent
Takahashi et al.

(10) Patent No.: US 9,011,688 B2
(45) Date of Patent: Apr. 21, 2015

(54) SEAWATER DESALINATION SYSTEM AND ENERGY EXCHANGE CHAMBER

(75) Inventors: Tamami Takahashi, Tokyo (JP); Kazuaki Maeda, Tokyo (JP); Masanori Goto, Tokyo (JP)

(73) Assignee: Ebara Corporation, Tokyo (JP)

( * ) Notice: Subject to any disclaimer, the term of this patent is extended or adjusted under 35 U.S.C. 154(b) by 414 days.

(21) Appl. No.: 13/447,518

(22) Filed: Apr. 16, 2012

(65) Prior Publication Data

US 2012/0267292 A1  Oct. 25, 2012

(30) Foreign Application Priority Data

Apr. 22, 2011 (JP) ................................. 2011-095704

(51) Int. Cl.
*B01D 61/06* (2006.01)
*C02F 1/44* (2006.01)
(Continued)

(52) U.S. Cl.
CPC .............. *C02F 1/441* (2013.01); *B01D 61/06* (2013.01); *B01D 2313/246* (2013.01); *C02F 1/006* (2013.01); *C02F 2103/08* (2013.01); *C02F 2201/003* (2013.01); *C02F 2301/022* (2013.01); *C02F 2303/10* (2013.01)

(58) Field of Classification Search
CPC .. C02F 2103/08; C02F 1/441; C02F 2303/10; C02F 2201/003; C02F 2301/022; C02F 1/006; B01D 2313/246; B01D 61/06
USPC ....................... 210/652, 96.2, 97, 258, 321.66
See application file for complete search history.

(56) References Cited

U.S. PATENT DOCUMENTS

| | | | |
|---|---|---|---|
| 3,489,159 | A | 1/1970 | Cheng et al. |
| 4,354,939 | A | 10/1982 | Pohl |
| 7,815,421 | B2 | 10/2010 | Bross et al. |

(Continued)

FOREIGN PATENT DOCUMENTS

| | | |
|---|---|---|
| CN | 201538698 | 8/2010 |
| JP | 2010-284642 | 12/2010 |

(Continued)

OTHER PUBLICATIONS

European Search Report issued Sep. 20, 2012 in European Application No. EP 12 00 2742.

(Continued)

*Primary Examiner* — John Kim
(74) *Attorney, Agent, or Firm* — Wenderoth, Lind & Ponack, L.L.P.

(57) ABSTRACT

An energy exchange chamber is used for exchanging pressure energy between concentrated seawater discharged from a reverse-osmosis membrane-separation apparatus and a part of seawater to be treated by the reverse-osmosis membrane separation apparatus in a seawater desalination system. The energy exchange chamber includes a concentrated seawater distributor communicating with a concentrated seawater port and configured to distribute a flow of concentrated seawater all over a horizontal plane of an interior of a chamber, and a seawater distributor communicating with a seawater port and configured to distribute a flow of seawater all over the horizontal plane of the interior of the chamber. The concentrated seawater and the seawater introduced into the chamber are brought into direct contact with each other over the horizontal plane of the interior of the chamber to exchange pressure energy between the concentrated seawater and the seawater introduced into the chamber.

8 Claims, 12 Drawing Sheets

(51) Int. Cl.
*C02F 1/00* (2006.01)
*C02F 103/08* (2006.01)

(56) References Cited

U.S. PATENT DOCUMENTS

| | | |
|---|---|---|
| 2009/0152197 A1 | 6/2009 | Lilas et al. |
| 2010/0187184 A1 | 7/2010 | Shi et al. |
| 2011/0089093 A1 | 4/2011 | Myran et al. |
| 2012/0061309 A1 | 3/2012 | Takahashi et al. |

FOREIGN PATENT DOCUMENTS

| | | |
|---|---|---|
| WO | 2009/072894 | 6/2009 |
| WO | 2011/045628 | 4/2011 |

OTHER PUBLICATIONS

Stefan Schafer, "New Pressure Exchanger Design Concept for Sustainable, Long Term Cost Savings", World Congress/Perth Convention and Exhibition Centre (PCEC), Perth, Western Australia, REF: IDAWC/PER11-087, Sep. 4-9, 2011.

SEAWATER DESALINATION SYSTEM AND ENERGY EXCHANGE CHAMBER

CROSS REFERENCE TO RELATED APPLICATIONS

This document claims priority to Japanese Application Number 2011-095704, filed Apr. 22, 2011, the entire contents of which are hereby incorporated by reference.

BACKGROUND OF THE INVENTION

1. Field of the Invention

The present invention relates to a seawater desalination system for desalinating seawater by removing salinity from the seawater and an energy exchange chamber (pressure exchange chamber) of an energy recovery device which is preferably used in the seawater desalination system.

2. Description of the Related Art

Conventionally, as a system for desalinating seawater, there has been known a seawater desalination system in which seawater passes through a reverse-osmosis membrane-separation apparatus to remove salinity from the seawater. In the seawater desalination system, the intake seawater is processed to have certain water qualities by a pretreatment system, and the pretreated seawater is delivered into the reverse-osmosis membrane-separation apparatus under pressure by a high-pressure pump. Part of the high-pressure seawater in the reverse-osmosis membrane-separation apparatus passes through a reverse-osmosis membrane against the reverse-osmosis pressure and is desalinated, and fresh water (permeate or desalted water) is taken out from the reverse-osmosis membrane-separation apparatus. The remaining seawater is discharged in a concentrated state of a high salt content as a concentrated seawater (reject or brine) from the reverse-osmosis membrane-separation apparatus. The largest operational cost in the seawater desalination system is energy cost for pressurizing the pretreated seawater up to such a pressure as to overcome the osmotic pressure, i.e. up to the reverse-osmosis pressure. That is, the operational cost of the seawater desalination system is greatly affected by pressurizing energy of the seawater by the high-pressure pump.

Specifically, more than half of the electric expenses as the highest cost in the seawater desalination system are consumed to operate the high-pressure pump for pressurizing the seawater. Therefore, pressure energy possessed by the high-pressure concentrated seawater (reject) with the high salt content which has been discharged from the reverse-osmosis membrane-separation apparatus is utilized for pressurizing part of the seawater. Therefore, as a means for utilizing the pressure energy of the concentrated seawater discharged from the reverse-osmosis membrane-separation apparatus to pressurize part of the seawater, there has been utilized an energy exchange chamber in which an interior of a cylinder is separated into two spaces by a piston arranged to be movable in the cylinder, a concentrated seawater port is provided in one of the two separated spaces to introduce and discharge the concentrated seawater, and a seawater port is provided in the other of the two separated spaces to introduce and discharge the seawater.

FIG. 19 is a schematic view showing a configuration example of a conventional seawater desalination system. As shown in FIG. 19, seawater pumped into the seawater desalination system by an intake pump (not shown) is processed to have certain water qualities by a pretreatment system, and then the pretreated seawater is delivered via a seawater supply line 1 into a high-pressure pump 2 that is driven by a motor M. The seawater which has been pressurized by the high-pressure pump 2 is supplied via a discharge line 3 to a reverse-osmosis membrane-separation apparatus 4 having a reverse-osmosis membrane (RO membrane). The reverse-osmosis membrane-separation apparatus 4 separates the seawater into concentrated seawater with a high salt content and fresh water with a low salt content and obtains the fresh water from the seawater. At this time, the concentrated seawater with a high salt content is discharged from the reverse-osmosis membrane-separation apparatus 4, and the discharged concentrated seawater still has a high-pressure. A concentrated seawater line 5 for discharging the concentrated seawater from the reverse-osmosis membrane-separation apparatus 4 is connected via a control valve 6 to a concentrated seawater port P1 of an energy exchange chamber 10. A seawater supply line 1 for supplying the pretreated seawater having a low pressure is branched at an upstream side of the high-pressure pump 2 and is connected via a valve 7 to a seawater port P2 of the energy exchange chamber 10. The energy exchange chamber 10 has a piston 12 therein, and the piston 12 is arranged to be movable in the energy exchange chamber 10.

The seawater pressurized by utilizing a pressure of the concentrated seawater in the energy exchange chamber 10 is supplied via the valve 7 to a booster pump 8. Then, the seawater is further pressurized by the booster pump 8 so that the seawater has the same pressure level as the discharge line 3 of the high-pressure pump 2, and the pressurized seawater merges via a valve 9 into the discharge line 3 of the high-pressure pump 2 and is then supplied to the reverse-osmosis membrane-separation apparatus 4.

In the above-described conventional energy exchange chamber, the piston in the energy exchange chamber is brought into sliding contact with the inner wall of the chamber, and thus the sliding member of the piston is required to be periodically replaced due to wear of the sliding member. Further, the inner diameter of the long chamber is required to be machined with high accuracy so as to fit with the outer shape of the piston, and thus machining cost is very expensive.

Therefore, the applicants of the present invention have proposed an energy exchange chamber having no piston in which a cylindrical and elongated chamber is used as a pressure exchange chamber and a plurality of partitioned fluid passages is provided in the chamber to directly pressurize the seawater with the high-pressure concentrated seawater which is discharged from the reverse-osmosis membrane (RO membrane) in Japanese Patent Publication No. 2010-284642.

In the energy exchange chamber disclosed in Japanese Patent Publication No. 2010-284642, in the case where the cylindrical and elongated chamber is installed horizontally, pressure is transmitted from the high-pressure concentrated seawater to the low-pressure seawater while the concentrated seawater and the seawater are separated into right and left parts in a horizontal direction and mixing of the concentrated seawater and the seawater is suppressed at a boundary where the two fluids are brought into contact with each other.

The present inventors have analyzed the energy exchange chamber in which an interface between the concentrated seawater and the seawater moves in the interior of the chamber by a pressure balance between the concentrated seawater and the seawater by a computer simulation that takes into consideration a difference in specific gravity of the concentrated seawater and the seawater, as disclosed in Japanese Patent Publication No. 2010-284642. As a result, the present inventors have learned that when the longitudinal direction of the chamber is placed horizontally, in the case where there is a difference in specific gravity, a problem arises.

Based on the above-described knowledge, the present inventors have conceived a means for separating the concentrated seawater and the seawater while mixing of the concentrated seawater and the seawater is suppressed even in the case where the longitudinal direction of the chamber is placed horizontally, and have made the present invention.

It is therefore an object of the present invention to provide an energy exchange chamber which can transmit a pressure from high-pressure concentrated seawater to seawater while the seawater and the concentrated seawater are separated into upper and lower and mixing of the seawater and the concentrated seawater is suppressed at a boundary where the two fluids are brought into contact with each other by supplying and discharging the concentrated water from a lower part of the chamber and by supplying and discharging the seawater from an upper part of the chamber.

Another object of the present invention is to provide a seawater desalination system having the above energy exchange chamber.

SUMMARY OF THE INVENTION

In order to achieve the above object, according to the present invention, there is provided an energy exchange chamber for exchanging pressure energy between concentrated seawater discharged from a reverse-osmosis membrane-separation apparatus and a part of seawater to be treated by the reverse-osmosis membrane separation apparatus in a seawater desalination system for producing fresh water from the seawater by supplying the seawater to the reverse-osmosis membrane-separation apparatus to separate the seawater into fresh water and concentrated seawater, the energy exchange chamber comprising: a chamber having a space for containing concentrated seawater and seawater therein; a concentrated seawater port provided at a lower part of the chamber for supplying and discharging the concentrated seawater; a seawater port provided at an upper part of the chamber for supplying and discharging the seawater; a concentrated seawater distributor communicating with the concentrated seawater port and configured to distribute a flow of the concentrated seawater flowing therein all over a horizontal plane of an interior of the chamber; and a seawater distributor communicating with the seawater port and configured to distribute a flow of the seawater flowing therein all over the horizontal plane of the interior of the chamber; wherein the concentrated seawater and the seawater introduced into the chamber are brought into direct contact with each other all over the horizontal plane of the interior of the chamber to exchange pressure energy between the concentrated seawater and the seawater.

According to the present invention, the concentrated seawater is supplied to and discharged from the chamber through the concentrated seawater port provided at the lower part of the chamber, and the seawater is supplied to and discharged from the chamber through the seawater port provided at the upper part of the chamber. The concentrated seawater flowing in the chamber is distributed all over the horizontal plane of the interior of the chamber by the concentrated seawater distributor, and the seawater flowing in the chamber is distributed all over the horizontal plane of the interior of the chamber by the seawater distributor. Because the concentrated seawater has higher specific gravity than the seawater, a boundary between the concentrated seawater and the seawater is formed due to the difference in the specific gravity, the concentrated seawater distributed all over the horizontal plane of the interior of the chamber pushes up the seawater distributed all over the horizontal plane of the interior of the chamber, and thus the pressure can be transmitted from the high-pressure concentrated seawater to the seawater while the seawater and the concentrated seawater are separated into upper and lower and while mixing of the concentrated seawater and the seawater at the boundary where the two fluids are brought into contact with each other is suppressed.

In a preferred aspect of the present invention, the chamber comprises a cylindrical chamber whose longitudinal direction is arranged horizontally.

In a preferred aspect of the present invention, the concentrated seawater distributor and the seawater distributor are horizontally arranged, and comprise pipes having a plurality of holes arranged so as to face the lowest part and the highest part of the inner surface of the chamber, respectively.

According to the present invention, in the case where the concentrated seawater is supplied from the concentrated seawater port and the seawater is discharged from the seawater port, the concentrated seawater supplied to the concentrated seawater port flows into a pipe-shaped concentrated seawater distributor communicating with the concentrated seawater port, and then flows in the chamber through the downward through-holes formed in the concentrated seawater distributor. The concentrated seawater which has flowed in the chamber, having higher specific gravity than the seawater, pushes up the seawater upwardly from below. On the other hand, the seawater having lower specific gravity which has been pushed up flows into a pipe-shaped seawater distributor through the upward through-holes formed in the pipe-shaped seawater distributor. A boundary between the concentrated seawater and the seawater is formed due to the difference in the specific gravity in the chamber, and the boundary ascends or descends in the chamber. In the case where the seawater is supplied from the seawater port and the concentrated seawater is discharge from the concentrated seawater port, the seawater supplied to the seawater port flows into the seawater distributor communicating with the seawater port, and then flows in the chamber through the through-holes formed in the seawater distributor, and the concentrated seawater is discharged from the through-holes formed in the concentrated seawater distributor to the concentrated seawater port communicating with the concentrated seawater distributor.

In a preferred aspect of the present invention, the pipes are cylindrical pipes or polygonal pipes.

According to the present invention, the concentrated seawater distributor and the seawater distributor comprise cylindrical or polygonal pipes arranged one above the other in the chamber. In the case where the concentrated seawater distributor and the seawater distributor comprise polygonal pipes, turbulence of the boundary between the concentrated seawater and the seawater due to contact with the pipes can be minimized even if the boundary is positioned above the lower end of the pipe or below the upper end of the pipe.

In a preferred aspect of the present invention, the energy exchange chamber further comprises a connecting member for connecting the concentrated seawater distributor and the seawater distributor; wherein each of connecting portions in the connecting member for connecting the concentrated seawater distributor and the seawater distributor has a substantially triangular cross-section in the vicinity of the concentrated seawater distributor or the seawater distributor.

According to the present invention, connecting portions of the connecting member for connecting the distributors have substantially triangular cross-sections whose cross-sectional areas are gradually enlarged so as to be closer to outer diameters of the distributors. Thus, any changes in the boundary when the boundary is positioned above the lower end of the seawater distributor or below the upper end of the concentrated seawater distributor can be reduced, and thus turbulence of the boundary can be suppressed.

In a preferred aspect of the present invention, wherein two perforated plates are provided on both sides of the plurality of holes so as to interpose the plurality of holes therebetween in a position where each of the concentrated seawater distributor and the seawater distributor faces the inner surface of the chamber, and the two perforated plates connect the inner surface of the chamber and the concentrated seawater distributor or the seawater distributor.

According to the present invention, two perforated plates for connecting surfaces of both sides of the seawater distributor and an inner circumferential surface of the chamber are provided, and two perforated plates for connecting surfaces of both sides of the concentrated seawater distributor and the inner circumferential surface of the chamber are provided. Thus, a first space formed by the concentrated seawater distributor and the two perforated plates, a third space formed by the seawater distributor and the two perforated plates and a second space between the first space and the third space are defined. With this structure, the concentrated seawater which flows in from the concentrated seawater distributor enters the first space, and passes through the perforated plates from the first space. At this time, the flow velocity of the concentrated seawater is uniformized by the perforated plates and the concentrated seawater whose flow velocity has been uniformized flows in the second space. With this action, the concentrated seawater in the second space flows upwardly more uniformly, and thus a pressure can be transmitted from the high-pressure concentrated seawater to the seawater while turbulence of the boundary is suppressed and mixing of the concentrated seawater and the seawater is suppressed. On the other hand, when the seawater which has been pushed up passes through the perforated plates from the second space, the flow velocity of the seawater is uniformized by the perforated plates. Then, the seawater whose flow velocity has been uniformized by the perforated plates flows in the third space, and then flows out from the upward through-holes formed in the seawater distributor.

According to the present invention, the perforated plate comprises a punching plate having a plurality of holes formed in a plate. The diameter of the hole is in the range of 3 to 10 mm. A porosity representing an area of holes with respect to an entire area of the plate is in the range of 30 to 60%. The perforated plate is configured to have small pressure loss generated when the fluid passes therethrough and to have flow uniformizing effect.

In a preferred aspect of the present invention, the concentrated seawater distributor and the seawater distributor comprise four perforated plates which partition a space radially between an outer surface of a pipe provided horizontally at the central part of the chamber and the inner surface of the chamber.

According to the present invention, four perforated plates which partition a space radially between an outer surface of the pipe and an inner surface of the chamber are provided, and a first space, a second space and a third space are formed between the outer surface of the pipe and the inner surface of the chamber. The concentrated seawater port communicates with the first space and the seawater port communicates with the third space. The concentrated seawater which has flowed in from the concentrated seawater port spreads in the first space, and flows in the second space after the flow of the concentrated seawater is uniformly regulated by the two perforated plates. The concentrated seawater whose flow has been uniformized in a circumferential direction by the perforated plates pushes up the seawater uniformly without causing turbulence of the boundary, and thus mixing of the concentrated seawater and the seawater in the interior of the chamber is suppressed. On the other hand, when the seawater which has been pushed up passes through the perforated plates from the second space, the flow velocity of the seawater is uniformized by the perforated plates. Then, the seawater whose flow has been uniformized by the perforated plates flows in the third space to push out the seawater in the third space to the seawater port side.

In a preferred aspect of the present invention, the concentrated seawater distributor and the seawater distributor comprise two perforated plates provided in a horizontal direction and arranged one above the other at intervals in the interior of the chamber.

According to the present invention, two perforated plates are arranged one above the other at intervals so as to extend in a horizontal direction in the interior of the chamber, and thus the chamber is partitioned from the bottom upwardly into a first space, a second space and a third space by the two perforated plate. The concentrated seawater which has flowed in from the concentrated seawater port spreads in the first space, and flows in the second space after the flow of the concentrated seawater is uniformly regulated by the lower perforated plate. The concentrated seawater flows upward so as to push up the seawater existing thereon in the second space. At this time, the flow of the concentrated seawater whose direction and velocity have been uniformized is formed by the lower perforated plate, and thus mixing of the concentrated seawater and the seawater is suppressed in the boundary in the second space. The same flow regulating effect is produced in the case where the seawater flows in the third space from the upper seawater port and flows in the second space from the third space through the upper perforated plate.

In a preferred aspect of the present invention, the concentrated seawater port and the seawater port are provided so as to pass through the outer circumferential surface of the chamber.

In a preferred aspect of the present invention, the chamber comprises a cylindrical chamber whose longitudinal direction is arranged vertically.

According to the present invention, a long cylindrical chamber is disposed such that a longitudinal direction of the chamber is placed in a vertical direction. The concentrated seawater port is provided at the lower part of the chamber so as to supply and discharge the concentrated seawater at the lower part of the chamber and the seawater port is provided at the upper part of the chamber so as to supply and discharge the seawater at the upper part of the chamber.

In a preferred aspect of the present invention, the concentrated seawater distributor and the seawater distributor comprise perforated plates arranged one above the other in the cylindrical chamber.

According to the present invention, the concentrated seawater distributor and the seawater distributor comprise perforated plates, and thus the concentrated seawater flowing in the concentrated seawater distributor from the concentrated seawater port and the seawater flowing in the seawater distributor from the seawater port can be distributed uniformly all over the horizontal plane of the interior of the chamber.

In a preferred aspect of the present invention, a plurality of partitioned fluid passages are provided between the perforated plates arranged one above the other.

According to the present invention, the concentrated seawater and the seawater are brought into contact with each other in the respective partitioned fluid passages. However, because vortexes generated in the fluid passage having a small cross-sectional area become small vortexes in the conduit, the concentrated seawater and the seawater do not diffuse widely and the boundary between the concentrated seawater and the seawater is not disturbed. In this manner, a plurality of fluid passages having a small cross-sectional area are assembled to form a large chamber, and thus the boundary between the concentrated seawater and the seawater is maintained in each of the fluid passages. As a whole, while the boundary between the concentrated seawater and the seawater is maintained, i.e., while mixing of the concentrated seawater and the seawater is suppressed, the seawater is pressurized and discharged by the concentrated seawater.

According to the present invention, there is provided a seawater desalination system for producing fresh water from seawater by supplying the seawater to a reverse-osmosis membrane-separation apparatus to separate the seawater into fresh water and concentrated seawater, the seawater desalination system comprising: an energy exchange chamber for exchanging pressure energy between the concentrated seawater discharged from the reverse-osmosis membrane-separation apparatus and a part of the seawater to be treated by the reverse-osmosis membrane separation apparatus.

According to the present invention, the following effects can be achieved.

1) A pressure can be transmitted from high-pressure concentrated seawater to seawater while the seawater and the concentrated seawater are separated into upper and lower by utilizing a difference in specific gravity and while mixing of the seawater and the concentrated seawater is suppressed at a boundary where the two fluids are brought into contact with each other by supplying and discharging the concentrated water from a lower part of the chamber and by supplying and discharging the seawater from an upper part of the chamber.

2) Because mixing of the concentrated seawater and the seawater in the chamber due to turbulent flow diffusion can be suppressed and the seawater having a high salt content is not delivered to the reverse-osmosis membrane-separation apparatus, the reverse-osmosis membrane-separation apparatus can provide sufficient performance and the replacement cycle of the reverse-osmosis membrane itself can be prolonged.

DETAILED DESCRIPTION OF THE PREFERRED EMBODIMENTS

Figure 1:
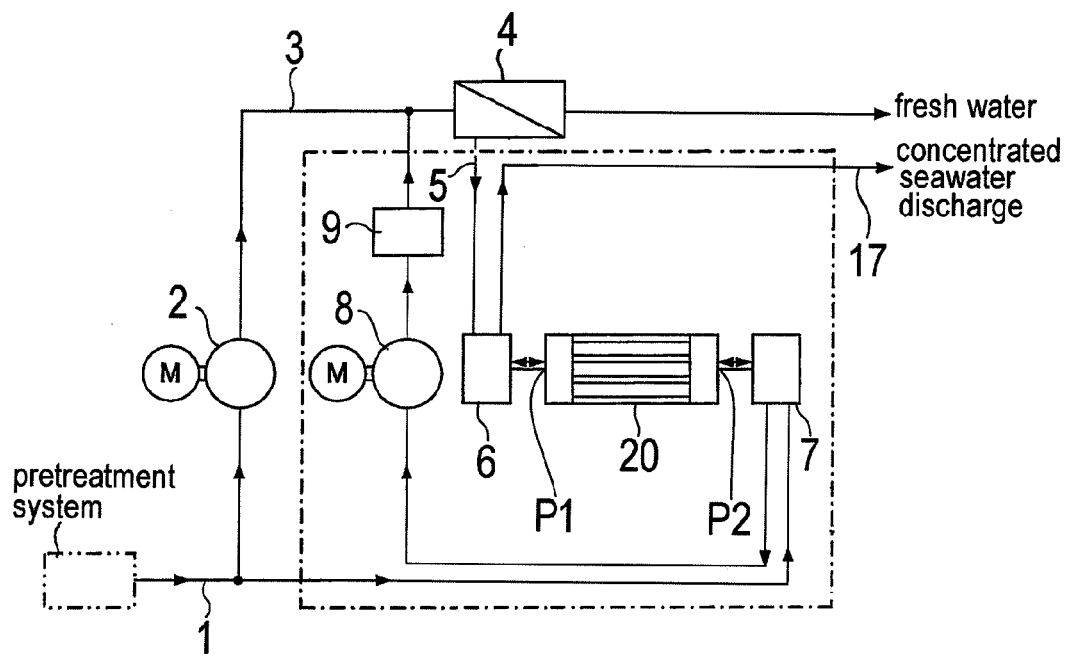
FIG. 1 is a schematic view showing a configuration example of a seawater desalination system according to the present invention.

A seawater desalination system according to preferred embodiments of the present invention will be described in detail below with reference to FIGS. 1 through 18. Like or corresponding parts are denoted by like or corresponding reference numerals in FIGS. 1 through 18 and will not be described below repetitively.

FIG. 1 is a schematic view showing a configuration example of a seawater desalination system according to the present invention. As shown in FIG. 1, seawater pumped into the seawater desalination system by an intake pump (not shown) is processed to have certain water qualities by a pretreatment system, and then the pretreated seawater is delivered via a seawater supply line 1 into a high-pressure pump 2 that is driven by a motor M. The seawater which has been pressurized by the high-pressure pump 2 is supplied via a discharge line 3 to a reverse-osmosis membrane-separation apparatus 4 having a reverse-osmosis membrane (RO membrane). The reverse-osmosis membrane-separation apparatus 4 separates the seawater into concentrated seawater (reject or brine) with a high salt content and fresh water (permeate or desalted water) with a low salt content and obtains the fresh water from the seawater. At this time, the concentrated seawater with a high salt content is discharged from the reverse-osmosis membrane-separation apparatus 4, and the discharged concentrated seawater still has a high-pressure. A concentrated seawater line 5 for discharging the concentrated seawater from the reverse-osmosis membrane-separation apparatus 4 is connected via a control valve 6 to a concentrated seawater port P1 of an energy exchange chamber (pressure exchange chamber) 20. A seawater supply line 1 for supplying the pretreated seawater having a low pressure is branched at an upstream side of the high-pressure pump 2 and is connected via a valve 7 to a seawater port P2 of the energy exchange chamber 20. The energy exchange chamber performs energy transmission from the high-pressure concentrated seawater to the low-pressure seawater while separating two fluids by a boundary between the concentrated seawater and the seawater.

The seawater pressurized by utilizing a pressure of the concentrated seawater in the energy exchange chamber 20 is supplied to a booster pump 8. Then, the seawater is further pressurized by the booster pump 8 so that the seawater has the same pressure level as the discharge line 3 of the high-pressure pump 2, and the pressurized seawater merges via a valve 9 into the discharge line 3 of the high-pressure pump 2 and is then supplied to the reverse-osmosis membrane-separation apparatus 4. On the other hand, the concentrated seawater which has pressurized the seawater and lost the energy is discharged from the energy exchange chamber 20 via the control valve 6 to a concentrated seawater discharge line 17.

Figure 2:
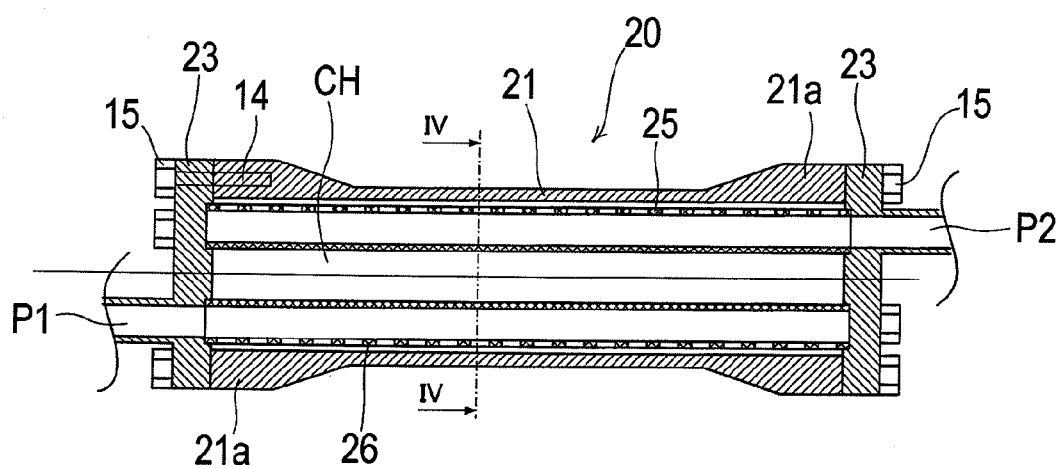
FIG. 2 is a cross-sectional view showing a configuration example of an energy exchange chamber according to the present invention.

FIG. 2 is a cross-sectional view showing a configuration example of the energy exchange chamber 20 according to the present invention. As shown in FIG. 2, the energy exchange chamber 20 comprises a long chamber body 21 having a cylindrical shape, and flanges 23 for closing both opening ends of the chamber body 21. A chamber CH is formed in the chamber body 21, and a concentrated seawater port P1 is formed in one of the flanges 23 and a seawater port P2 is formed in the other of the flanges 23. The chamber body 21 has large diameter portions 21a having larger outer diameters at both ends than an outer diameter at a central portion of the chamber body 21, and stud bolts 14 are embedded in the large diameter portions 21a. The stud bolts 14 are fixed so as to project from the ends of the flanges 23, and nuts 15 are fastened to the stud bolts 14 to fix the flanges 23 to the chamber body 21.

The energy exchange chamber 20 is installed horizontally. The concentrated seawater port P1 is provided at a lower part of the chamber CH so as to supply and discharge the concentrated seawater at the lower part of the chamber CH, and the seawater port P2 is provided at an upper part of the chamber CH so as to supply and discharge the seawater at the upper part of the chamber CH.

Further, two pipes 25 and 26 are arranged one above the other in the chamber CH, and the seawater port P2 communicates with the upper pipe 25 and the concentrated seawater port P1 communicates with the lower pipe 26. The upper and lower pipes 25 and 26 comprise cylindrical pipes and are fixed by the flanges 23, 23.

Figure 3:
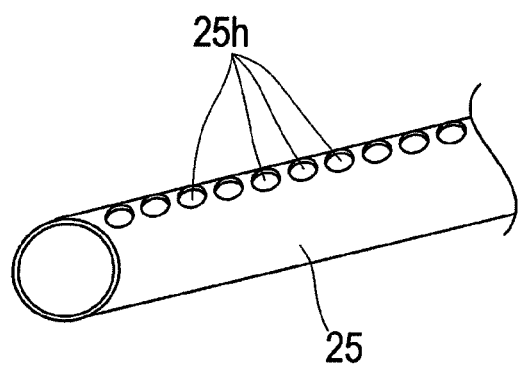
FIG. 3 is a perspective view showing an upper pipe arranged in a chamber.

FIG. 3 is a perspective view showing the upper pipe 25 arranged in the chamber CH. As shown in FIG. 3, the upper pipe 25 arranged at the upper part of the chamber CH has a plurality of holes 25h at an upper part thereof, and the plurality of holes 25h penetrate the wall of the pipe into a hollow portion of the pipe 25. Although the lower pipe 26 arranged at the lower part of the chamber CH has the same structure as the upper pipe 25, the lower pipe 26 is flip vertical of the upper pipe 25 shown in FIG. 3 and has through-holes formed downwardly.

Figure 4:
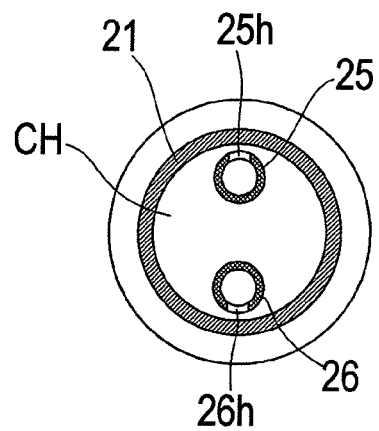
FIG. 4 is a cross-sectional view taken along line IV-IV of FIG. 2.

FIG. 4 is a cross-sectional view taken along line W-W of FIG. 2. As shown in FIG. 4, the upper pipe 25 and the lower pipe 26 are arranged one above the other at intervals in the chamber CH formed in the interior of the cylindrical chamber body 21. A plurality of holes 25h are formed at the upper part of the upper pipe 25 and a plurality of holes 26h are formed at the lower part of the lower pipe 26.

Figure 5:
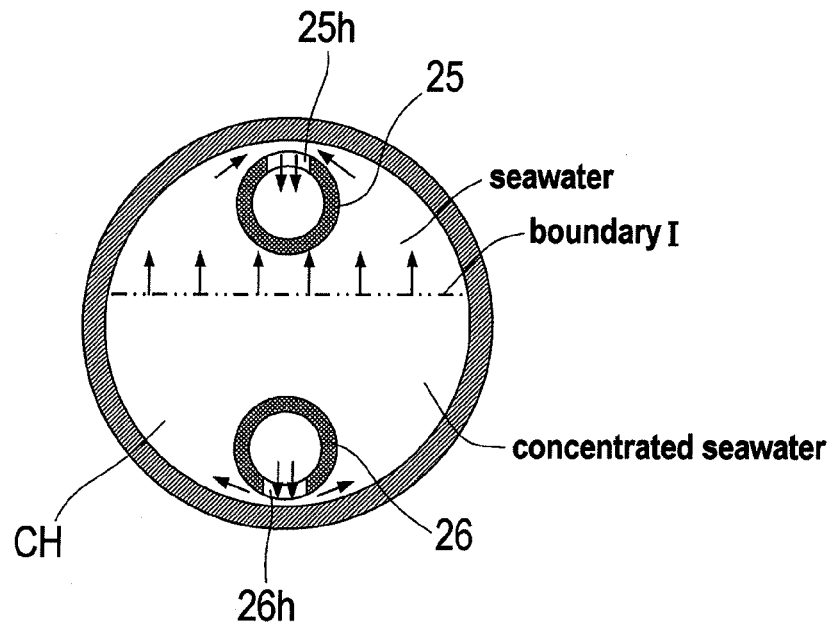
FIG. 5 is a view showing an operation of the energy exchange chamber according to the present invention, and is a schematic view corresponding to FIG. 4.
Figure 6:
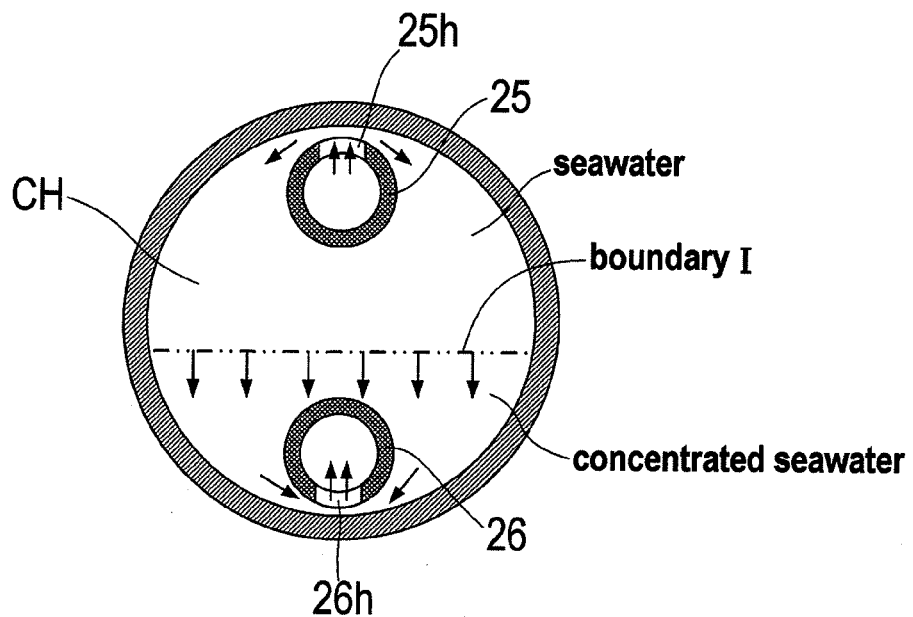
FIG. 6 is a view showing an operation of the energy exchange chamber according to the present invention, and is a schematic view corresponding to FIG. 4.

FIGS. 5 and 6 are views showing an operation of the energy exchange chamber according to the present invention, and are schematic views corresponding to FIG. 4. FIG. 5 is the view showing the state in which the concentrated seawater is supplied from the concentrated seawater port P1 and the seawater is discharged from the seawater port P2. As shown in FIG. 5, the concentrated seawater supplied to the concentrated seawater port P1 flows into the lower pipe 26 communicating with the port P1, and then flows in the chamber CH through the downward through-holes 26h formed in the lower pipe 26. The concentrated seawater which has flowed in the chamber CH, having higher specific gravity than the seawater, pushes up the seawater upwardly from below. On the other hand, the seawater having lower specific gravity which has been pushed up flows into the upper pipe 25 through the upward through-holes 25h formed in the upper pipe 25. A boundary I between the concentrated seawater and the seawater is formed due to the difference in the specific gravity in the chamber CH, and the boundary I ascends or descends in the chamber CH.

The above-described operation is performed by the fact that the high-pressure concentrated seawater from the reverse-osmosis membrane (RO membrane) communicates with the concentrated seawater port P1 by the control valve 6 provided upstream of the concentrated seawater port P1 of the energy exchange chamber 20 (see FIG. 1) to form a flow of the high-pressure concentrated seawater supplied to the energy exchange chamber 20. Because pressures in the interior of the chamber CH of the energy exchange chamber 20 become the same pressure, the pressure of the seawater becomes equal to the pressure of the high-pressure concentrated seawater supplied from the reverse-osmosis membrane (RO membrane) to the energy exchange chamber 20. In this manner, pressure energy of the concentrated seawater is transmitted to the seawater and the high-pressure seawater is discharged from the seawater port P2.

FIG. 6 is the view showing the state in which the seawater is supplied from the seawater port P2 and the concentrated seawater is discharge from the concentrated seawater port P1. As shown in FIG. 6, contrary to the operation of FIG. 5, the seawater supplied to the seawater port P2 flows into the upper pipe 25 communicating with the port P2, and then flows in the chamber CH through the through-holes 25h formed in the upper pipe 25, and the concentrated seawater is discharged from the through-holes 26h formed in the lower pipe 26 to the concentrated seawater port P1 communicating with the lower pipe 26. At this time, similarly, the seawater having lower specific gravity pushes down the concentrated seawater having higher specific gravity from an upper part of the chamber CH. This operation is performed by the fact that the concentrated seawater port P1 communicates with the discharge side by the control valve 6 provided upstream of the concentrated seawater port P1 of the energy exchange chamber 20 to form a flow of the low-pressure seawater supplied to the energy exchange chamber 20.

By controlling supply and discharge of the concentrated seawater by the control valve 6, the low-pressure seawater is pressurized so as to be equal to the pressure of the high-pressure concentrated seawater and the pressurized seawater is supplied from the seawater port P2 to the reverse-osmosis membrane (RO membrane) by the energy recovery apparatus (energy exchange chamber). The boundary I between the concentrated seawater and the seawater is shown by a chain double-dashed line. Actually, however, at the boundary where the concentrated seawater and the seawater are brought into contact with each other, the concentrated seawater and the seawater are mixed to form a laminar mixed layer.

Figure 7:
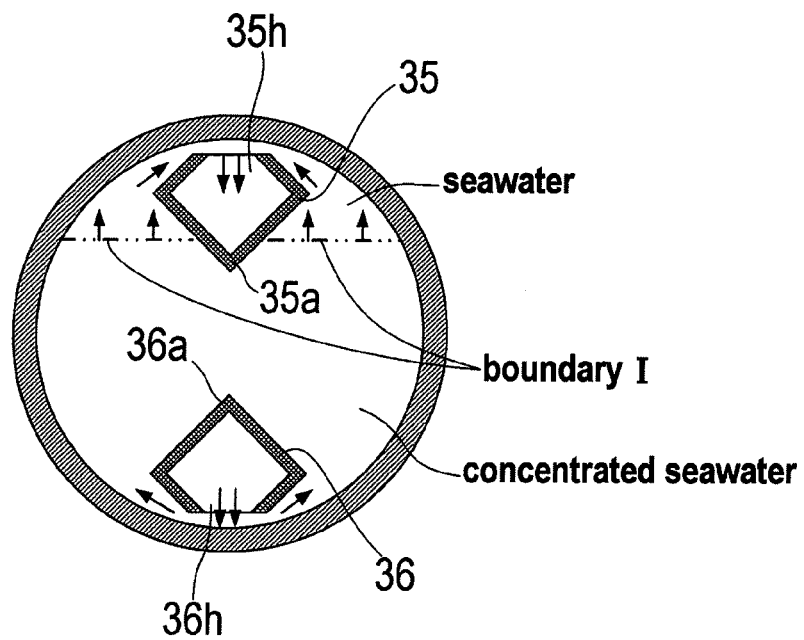
FIG. 7 is a cross-sectional view showing a modified example of the energy exchange chamber according to the present invention.

FIG. 7 is a cross-sectional view showing a modified example of the energy exchange chamber according to the present invention. In the embodiment shown in FIG. 7, the upper pipe and the lower pipe in the embodiment shown in FIGS. 2 through 6 are modified into square pipes. Specifically, as shown in FIG. 7, an upper pipe 35 and a lower pipe 36 comprise polygonal pipes. The upper pipe 35 is arranged such that a corner 35a is located at the lower part of the upper pipe 35 and holes 35h are located at the upper part of the upper pipe 35. Further, the lower pipe 36 is arranged such that a corner 36a is located at the upper part of the lower pipe 36 and holes 36h are located at the lower part of the lower pipe 36. In this manner, the upper pipe 35 and the lower pipe 36 are made square, and thus turbulence of the boundary I due to contact with the pipes can be minimized even if the boundary I between the concentrated seawater and the seawater is positioned above the lower end of the upper pipe 35 or below the upper end of the lower pipe 36. FIG. 7 shows the state in which the boundary I is positioned above the lower end (corner 35a) of the upper pipe 35.

Figure 8:
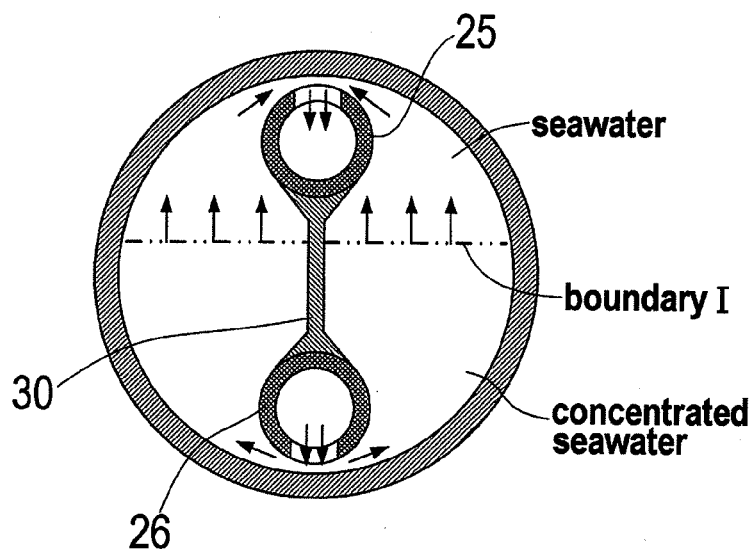
FIG. 8 is a cross-sectional view showing another modified example of the energy exchange chamber according to the present invention.

FIG. 8 is a cross-sectional view showing another modified example of the energy exchange chamber according to the present invention. In the embodiment shown in FIG. 8, an upper pipe and a lower pipe comprise the same cylindrical pipes as with the embodiment shown in FIGS. 2 through 6 and a connecting member for connecting the upper pipe and the lower pipe is provided. Specifically, as shown in FIG. 8, a connecting member 30 for connecting the cylindrical upper pipe 25 and the cylindrical lower pipe 26 is provided. Connecting portions of the connecting member 30 for connecting the respective pipes 25, 26 have substantially triangular cross-sections whose cross-sectional areas are gradually enlarged so as to be closer to outer diameters of the pipes. With this structure, any changes in the boundary I when the boundary I is positioned above the lower end of the upper pipe 25 or below the upper end of the lower pipe 26 can be reduced, and thus turbulence of the boundary I can be suppressed. The connecting member is configured as a continuous member extending from end to end in the longitudinal direction of the upper pipe and the lower pipe.

Figure 9:
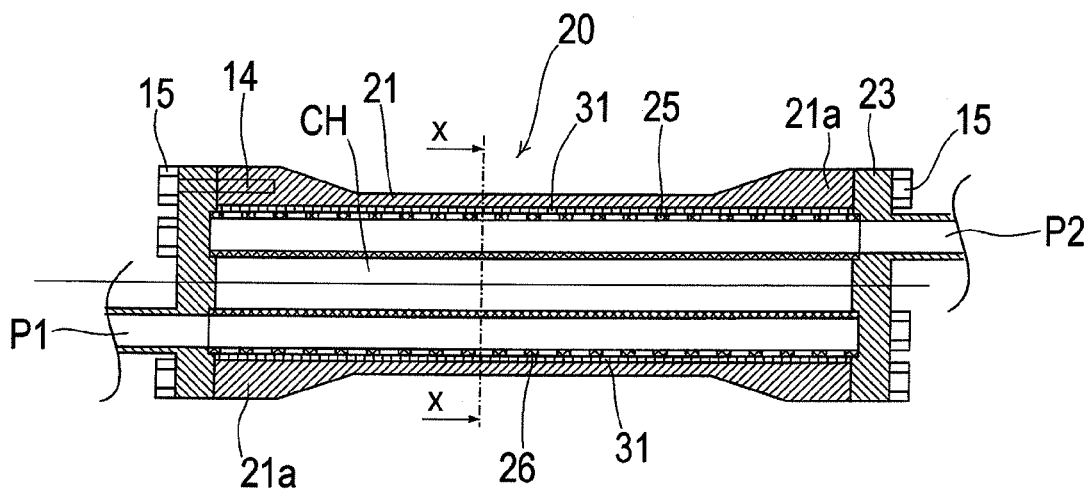
FIG. 9 is a cross-sectional view showing another modified example of the energy exchange chamber according to the present invention.
Figure 10:
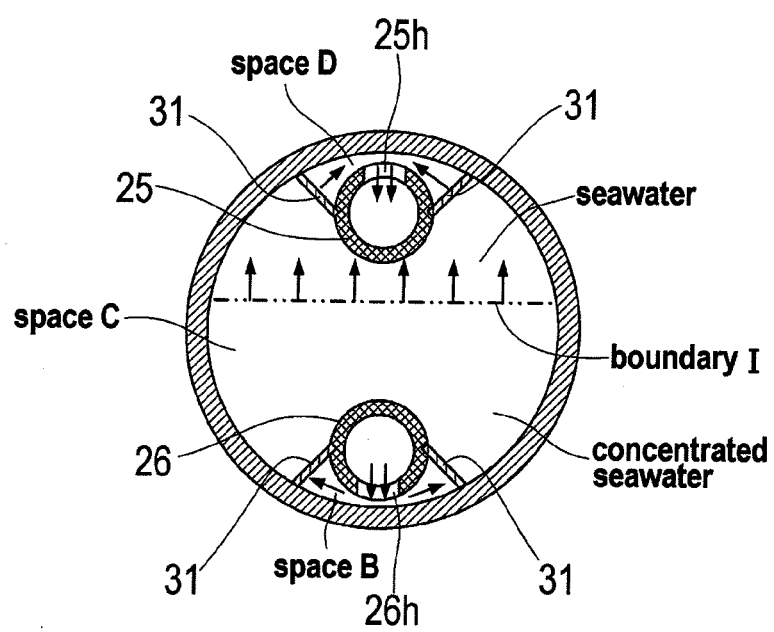
FIG. 10 is a cross-sectional view taken along line X-X of FIG. 9.

FIGS. 9 and 10 are cross-sectional views showing another modified example of the energy exchange chamber according to the present invention. FIG. 9 is a cross-sectional view of the energy exchange chamber, and FIG. 10 is a cross-sectional view taken along line X-X of FIG. 9. In the embodiment shown in FIGS. 9 and 10, perforated plates are provided to connect the chamber body 21 to the upper pipe 25 and the lower pipe 26 in the embodiment shown in FIGS. 2 through 6. Specifically, as shown in FIG. 10, two perforated plates 31, 31 for connecting surfaces of both sides of the upper pipe 25 and an inner circumferential surface of the chamber body 21 are provided, and two perforated plates 31, 31 for connecting surfaces of both sides of the lower pipe 26 and the inner circumferential surface of the chamber body 21 are provided. With this structure, a space B formed by the lower pipe 26 and the two perforated plates 31, 31, a space D formed by the upper pipe 25 and the two perforated plates 31, 31 and a space C between the space B and space D are defined. With this structure, the concentrated seawater which flows in from the lower pipe 26 enters the space B, and passes through the perforated plates 31 from the space B. At this time, the flow velocity of the concentrated seawater is uniformized by the perforated plates 31 and the concentrated seawater whose flow velocity has been uniformized flows in the space C. With this action, the concentrated seawater in the space C flows upwardly more uniformly, and thus a pressure can be transmitted from the high-pressure concentrated seawater to the seawater while turbulence of the boundary I is suppressed and mixing of the concentrated seawater and the seawater is suppressed. On the other hand, when the seawater which has been pushed up passes through the perforated plates 31 from the space C, the flow velocity of the seawater is uniformized by the perforated plates 31. Then, the seawater whose flow velocity has been uniformized by the perforated plates 31 flows in the space D, and then flows out from the upper pipe 25.

Figure 11:
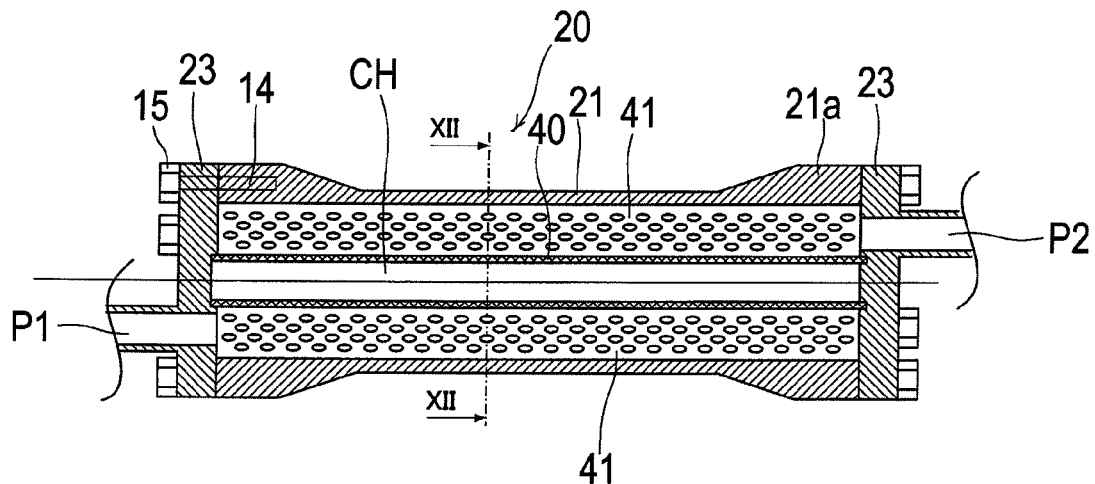
FIG. 11 is a cross-sectional view showing another embodiment of the energy exchange chamber according to the present invention.
Figure 12:
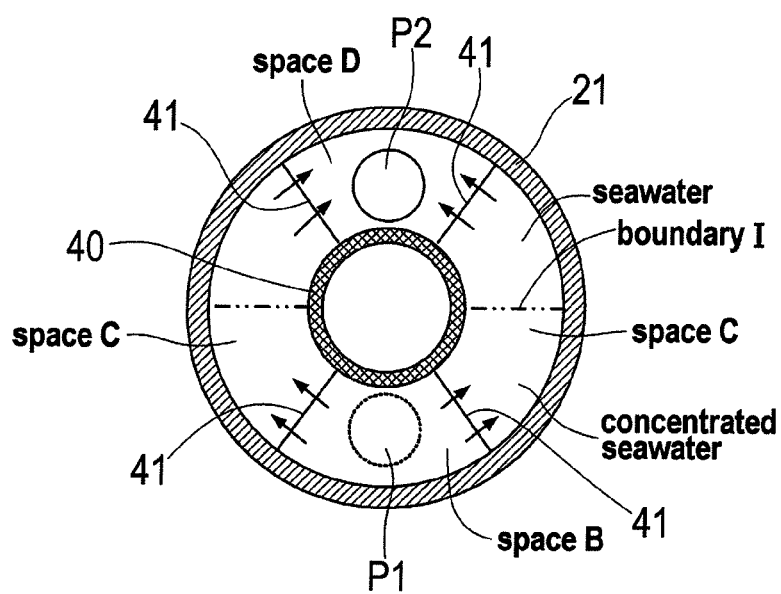
FIG. 12 is a cross-sectional view taken along line XII-XII of FIG. 11.

FIGS. 11 and 12 are views showing another embodiment of the energy exchange chamber according to the present invention. FIG. 11 is a cross-sectional view of the energy exchange chamber, and FIG. 12 is a cross-sectional view taken along line XII-XII of FIG. 11. As shown in FIGS. 11 and 12, a cylindrical pipe 40 is provided at the central part of the chamber CH and the pipe 40 is fixed by the flanges 23, 23. As shown in FIG. 12, four perforated plates 41 which partition a space radially between an outer circumference of the pipe 40 and an inner circumference of the chamber body 21 are provided. As shown in FIG. 11, the perforated plates 41 extend between both the flanges 23, 23. By these four perforated plates 41, a space B, spaces C and a space D are formed between the chamber body 21 and the pipe 40. The concentrated seawater port P1 communicates with the space B and the seawater port P2 communicates with the space D.

In the energy exchange chamber configured as shown in FIGS. 11 and 12, the concentrated seawater which has flowed in from the concentrated seawater port P1 spreads in the space B, and flows in the spaces C after the flow of the concentrated seawater is uniformly regulated by the two perforated plates 41. The concentrated seawater whose flow has been uniformized in a circumferential direction by the perforated plates 41 pushes up the seawater uniformly without causing turbulence of the boundary I, and thus mixing of the concentrated seawater and the seawater in the interior of the chamber CH is suppressed. On the other hand, when the seawater which has been pushed up passes through the upper perforated plates 41 from the spaces C, the flow velocity of the seawater is uniformized by the perforated plates 41. Then, the seawater whose flow has been uniformized by the perforated plates 41 flows in the space D to push out the seawater in the space D to the side of the seawater port P2.

Figure 13:
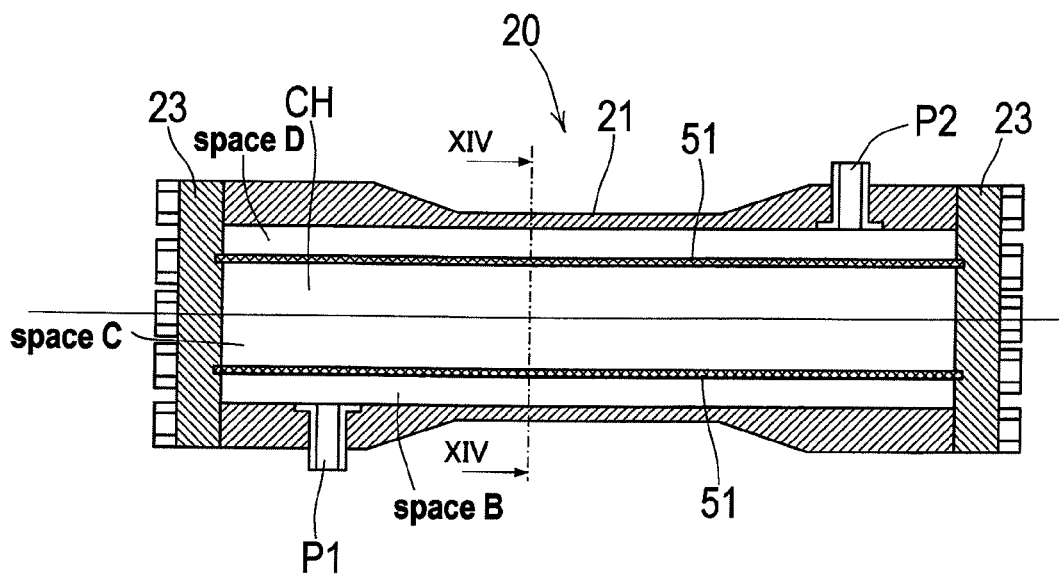
FIG. 13 is a cross-sectional view showing another embodiment of the energy exchange chamber according to the present invention.
Figure 14:
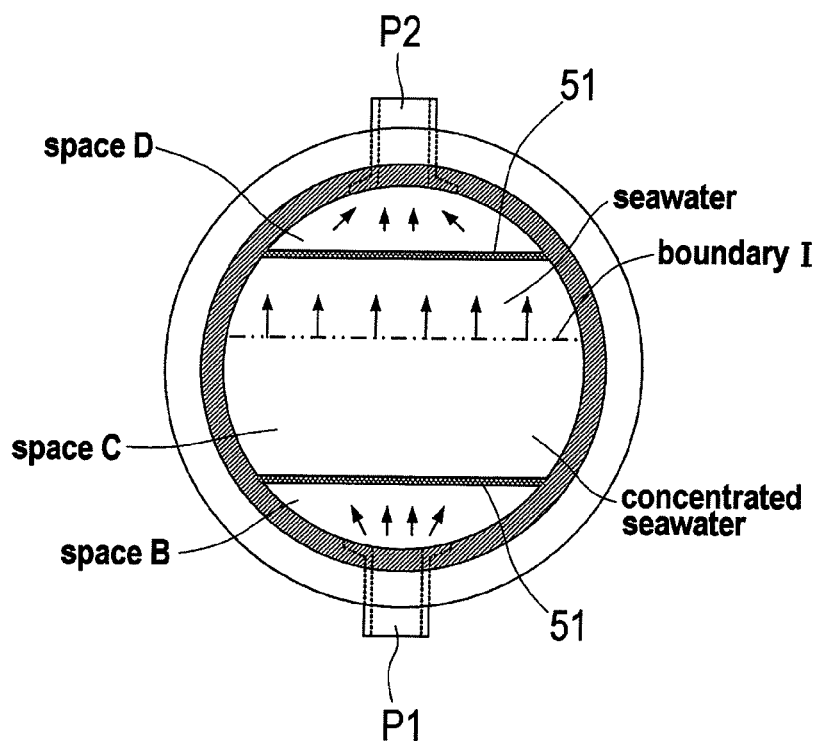
FIG. 14 is a cross-sectional view taken along line XIV-XIV of FIG. 13.

FIGS. 13 and 14 are views showing another embodiment of the energy exchange chamber according to the present invention. FIG. 13 is a cross-sectional view of the energy exchange chamber, and FIG. 14 is a cross-sectional view taken along line XIV-XIV of FIG. 13. As shown in FIG. 13, in the present embodiment, the concentrated seawater port P1 and the seawater port P2 are provided so as to pass through a side surface of the chamber CH. As shown in FIG. 14, two perforated plates 51, 51 are arranged one above the other at intervals so as to extend in a horizontal direction in the interior of the chamber body 21. As shown in FIG. 13, the perforated plates 51, 51 extend between both the flanges 23, 23. As shown in FIG. 14, the chamber CH is partitioned from the bottom upwardly into three spaces, i.e., a space B, a space C and a space D by the two perforated plates 51, 51.

In the energy exchange chamber configured as shown in FIGS. 13 and 14, the concentrated seawater which has flowed in from the concentrated seawater port P1 spreads in the space B, and flows in the space C after the flow of the concentrated seawater is uniformly regulated by the lower perforated plate 51. The concentrated seawater flows upward so as to push up the seawater existing thereon in the space C. At this time, the flow of the concentrated seawater whose direction and velocity have been uniformized is formed by the perforated plate 51, and thus mixing of the concentrated seawater and the seawater is suppressed in the boundary I in the space C. The same flow regulating effect is produced in the case where the seawater flows in the space D from the upper seawater port P2 and flows in the space C from the space D through the perforated plate 51.

Figure 15:
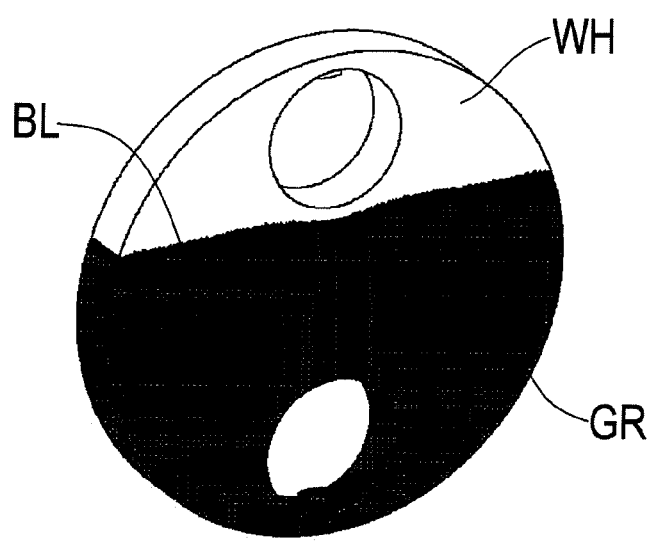
FIG. 15 is an example of a computer simulation showing analysis results in the case where the concentrated seawater and the seawater are introduced in the energy exchange chamber having the structure shown in FIGS. 2 through 6 and the boundary rises to a level just below the upper pipe.

FIG. 15 is an example of a computer simulation showing analysis results in the case where the concentrated seawater and the seawater are introduced in the energy exchange chamber 20 having the structure shown in FIGS. 2 through 6 and the boundary I rises to a level just below the upper pipe.

In FIG. 15, a part GR shown in gray indicates the concentrated seawater and a part WH shown in white indicates the seawater. A part BL shown in black indicates an area (mixing section) where the two fluids are mixed. Specific gravity of the concentrated seawater is approximately 1.06 and specific gravity of the seawater is approximately 1.03.

Figure 16:
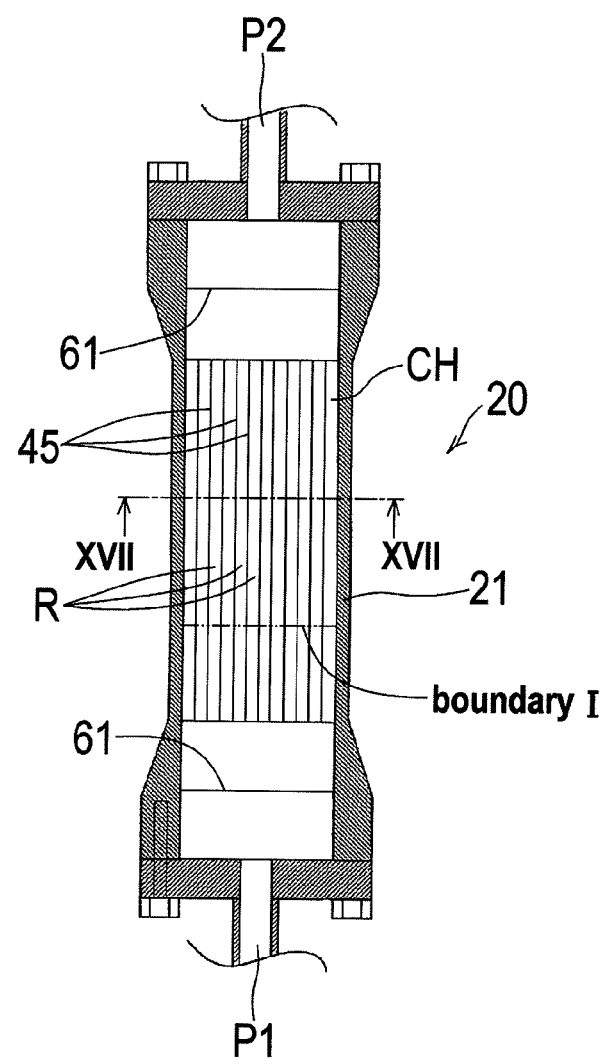
FIG. 16 is a cross-sectional view showing another embodiment of the energy exchange chamber according to the present invention.

FIG. 16 is a cross-sectional view showing another embodiment of the energy exchange chamber 20 according to the present invention. As shown in FIG. 16, in the present embodiment, the energy exchange chamber 20 is installed vertically. Specifically, a long chamber body 21 having a cylindrical shape is disposed such that a longitudinal direction of the chamber is placed in a vertical direction. The concentrated seawater port P1 is provided at a lower part of the chamber CH so as to supply and discharge the concentrated seawater at the lower part of the chamber CH, and the seawater port P2 is provided at an upper part of the chamber CH so as to supply and discharge the seawater at the upper part of the chamber CH. A plurality of tubes 45 having a diameter smaller than that of the chamber CH defined in the chamber body 21 are disposed between the concentrated seawater port P1 and the seawater port P2 in the chamber body 21. A plurality of partitioned fluid passages R are formed by the plurality of tubes 45 having a small diameter and fixed in the chamber CH. Thus, the concentrated seawater port P1 and the seawater port P2 communicate with each other by these fluid passages R. Because each of the tubes 45 comprises a tube having a small diameter, a circular cross-sectional area of the fluid passage in the tube is set to be small.

Figure 17:
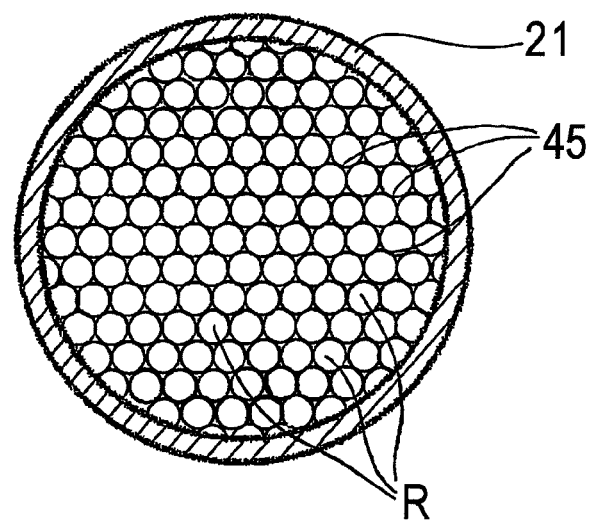
FIG. 17 is a cross-sectional view taken along line XVII-XVII of FIG. 16.

FIG. 17 is a cross-sectional view taken along line XVII-XVII of FIG. 16. As shown in FIG. 17, a plurality of tubes 45, each having a small diameter, is disposed in the chamber formed in the chamber body 21. Fluid passages R for allowing the concentrated seawater and the seawater to flow therein are formed in the respective tubes 45.

Perforated plates 61 for regulating a flow of fluid are installed in a space between the concentrated seawater port P1 and the passages R and in a space between the seawater port P2 and the passages R, respectively. The perforated plates 61 are arranged at predetermined intervals from the ports P1 and P2. The perforated plates 61 are also arranged at predetermined intervals from the end portions of the partitioned fluid passages R. By arranging the perforated plates 61 in this manner, the fluid which flows in from the ports P1, P2 having a small diameter can be distributed uniformly in the chamber having a large diameter to cause the fluid to flow equally in a plurality of partitioned fluid passages R.

At this time, the concentrated seawater and the seawater are brought into contact with each other in the respective partitioned fluid passages R. However, because vortexes generated in the fluid passage R having a small cross-sectional area become small vortexes in the conduit, the concentrated seawater and the seawater do not diffuse widely and the boundary I between the concentrated seawater and the seawater is not disturbed. In this manner, a plurality of fluid passages R having a small cross-sectional area are assembled to form a large chamber, and thus the boundary I between the concentrated seawater and the seawater is maintained in each of the fluid passages R. As a whole, while the boundary I between the concentrated seawater and the seawater is maintained, i.e., while mixing of the concentrated seawater and the seawater is suppressed, the seawater is pressurized and discharged by the concentrated seawater. Also, in the case where the seawater flows into the partitioned fluid passages R from the upper seawater port P2 through the perforated plates 61, the same flow regulating effect is obtained.

In FIGS. 16 and 17, an example of forming a plurality of the partitioned fluid passages R in the chamber CH by a plurality of tube 45 having a circular cross-section is shown. However, honeycomb-shaped or lattice-shaped partitioned fluid passages R may be formed in the chamber CH.

Figure 18:
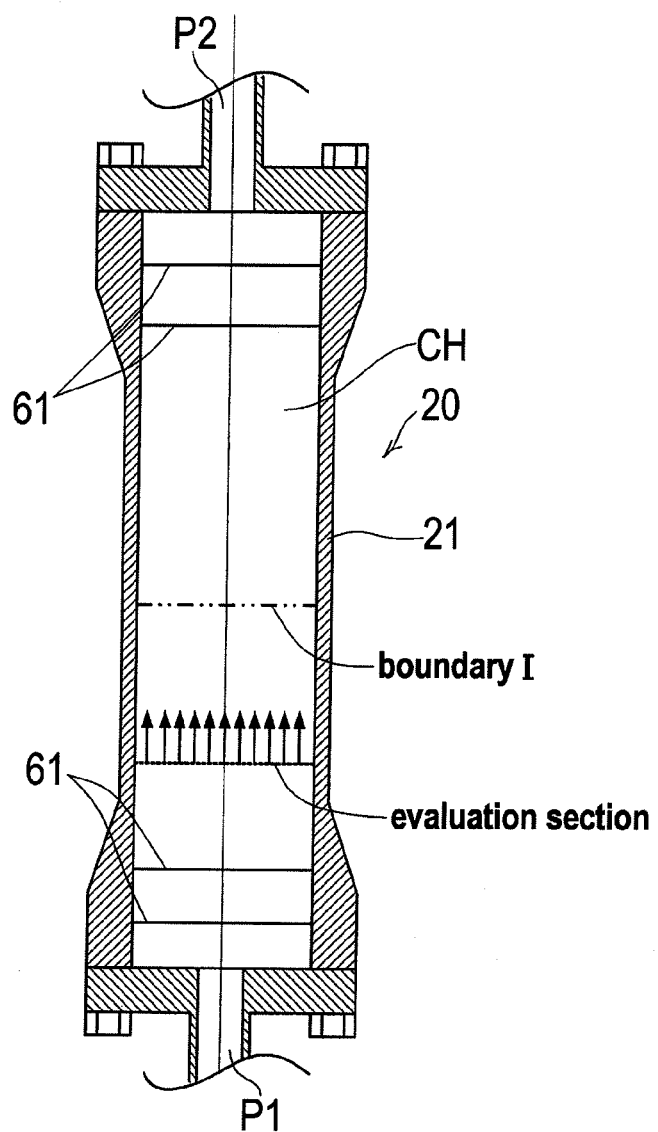
FIG. 18 is a cross-sectional view showing a modified example of the energy exchange chamber according to the present invention shown in FIG. 16.
Figure 19:
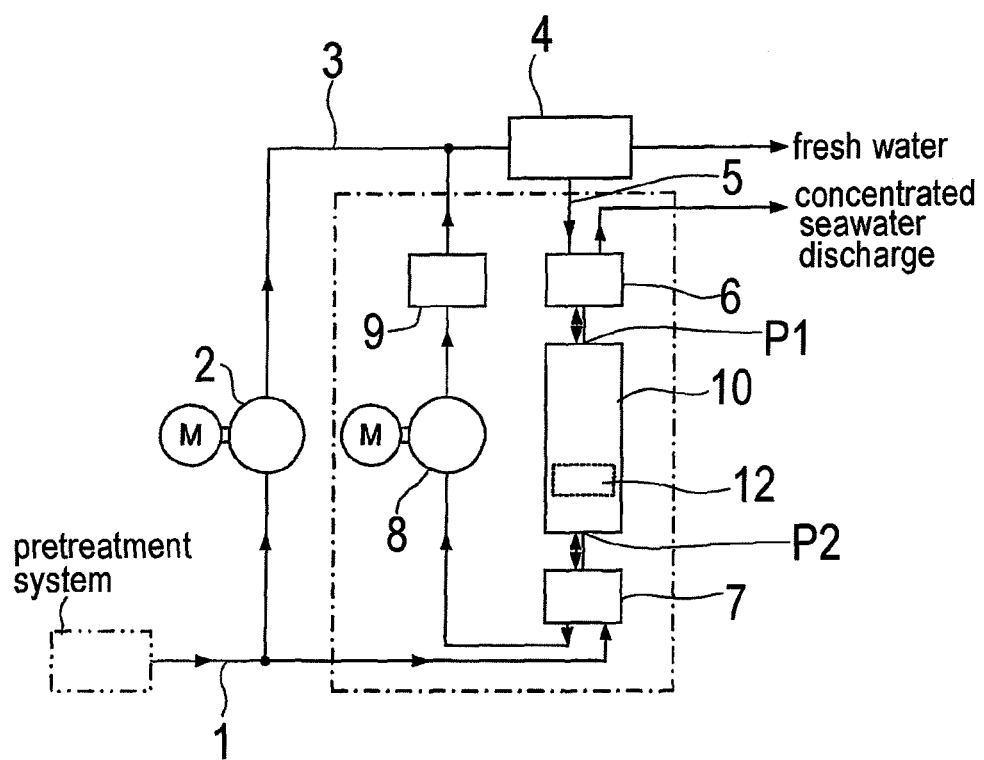
FIG. 19 is a schematic view showing a configuration example of a conventional seawater desalination system.

FIG. 18 is a cross-sectional view showing a modified example of the energy exchange chamber 20 according to the present invention shown in FIG. 16. As shown in FIG. 18, in the present embodiment, the energy exchange chamber 20 is installed vertically. Specifically, a long chamber body 21 having a cylindrical shape is disposed such that a longitudinal direction of the chamber is placed in a vertical direction. The concentrated seawater port P1 is provided at a lower part of the chamber CH so as to supply and discharge the concentrated seawater at the lower part of the chamber CH, and the seawater port P2 is provided at an upper part of the chamber CH so as to supply and discharge the seawater at the upper part of the chamber CH. Two perforated plates 21 for regulating a flow of fluid are disposed in the vicinity of the concentrated seawater port P1 and the seawater port P2, respectively. The perforated plates 61 are arranged at predetermined intervals from the ports P1 and P2. A chamber CH is defined between the perforated plate 61 at the side of the port P1 and the perforated plate 61 at the side of the port P2. By arranging the perforated plates 61 in this manner, the fluid which flows in from the ports P1, P2 having a small diameter can be uniformly flowed in the chamber CH having a large diameter.

Here, a uniform flow of fluid means that flow velocity and direction of fluid in a certain horizontal cross-section in the chamber CH are uniform. Specifically, it means that in the case where a length of arrow and a direction of arrow are defined as flow velocity of fluid and flow direction of fluid, respectively at any given horizontal cross-section (evaluation cross-section) in the interior of the chamber CH shown in FIG. 18, all arrows have the same length and the same direction. This fluid flow can be adjusted by porosity of the perforated plate and the positions of the perforated plates from the respective ports P1, P2. The dimension and position of the perforated plate are optimized by analysis or the like.

The seawater and the concentrated seawater which have flowed uniformly in the chamber CH through the perforated plates 61 are separated into upper and lower by the difference in specific gravity, and simultaneously uniform flow is formed in a vertical direction in the cross-sectional area of the chamber, and thus the boundary I between the concentrated seawater and the seawater is maintained in each of the fluid passages R. As a whole, while the boundary I between the concentrated seawater and the seawater is maintained, i.e., while mixing of the concentrated seawater and the seawater is suppressed, the seawater is pressurized and discharged by the concentrated seawater. The same flow regulating effect can be obtained in the case where the seawater flows in the chamber CH from the upper seawater port P2 through the perforated plates 61.

Although certain preferred embodiments of the present invention have been shown and described in detail, it should be understood that various changes and modifications may be made in the energy exchange chamber and the like without departing from the scope of the appended claims.

What is claimed is:

1. An energy exchange chamber for exchanging pressure energy between concentrated seawater discharged from a reverse-osmosis membrane-separation apparatus and a part of seawater to be treated by the reverse-osmosis membrane separation apparatus in a seawater desalination system for producing fresh water from the seawater by supplying the seawater to the reverse-osmosis membrane-separation apparatus to separate the seawater into fresh water and concentrated seawater, said energy exchange chamber comprising:

a chamber having a space for containing concentrated seawater and seawater therein;

a concentrated seawater port provided at a lower part of said chamber for supplying and discharging the concentrated seawater;

a seawater port provided at an upper part of said chamber for supplying and discharging the seawater;

a concentrated seawater distributor in communication with said concentrated seawater port and configured to distribute a flow of the concentrated seawater all over a horizontal plane of an interior of said chamber; and a seawater distributor in communication with said seawater port and configured to distribute a flow of the seawater all over the horizontal plane of the interior of said chamber;

wherein the concentrated seawater and the seawater introduced into said chamber are brought into direct contact with each other all over the horizontal plane of the interior of said chamber to exchange pressure energy between the concentrated seawater and the seawater;

wherein said concentrated seawater distributor and said seawater distributor are horizontally arranged, said concentrated seawater distributor comprising a pipe having a plurality of holes arranged so as to face a lowest part of an inner surface of said chamber, and said seawater distributor comprising a pipe having a plurality of holes arranged so as to face a highest part of the inner surface of said chamber; and wherein, in each of said concentrated seawater distributor and said seawater distributor, said plurality of holes is configured to penetrate a wall of said pipe into a hollow portion of said pipe.

2. The energy exchange chamber according to claim 1, wherein said chamber comprises a cylindrical chamber, a longitudinal direction of the cylindrical chamber being arranged horizontally.

3. The energy exchange chamber according to claim 1, wherein said pipe of said concentrated seawater distributor and said pipe of said seawater distributor are cylindrical pipes or polygonal pipes.

4. An energy exchange chamber for exchanging pressure energy between concentrated seawater discharged from a reverse-osmosis membrane-separation apparatus and a part of seawater to be treated by the reverse-osmosis membrane separation apparatus in a seawater desalination system for producing fresh water from the seawater by supplying the seawater to the reverse-osmosis membrane-separation apparatus to separate the seawater into fresh water and concentrated seawater, said energy exchange chamber comprising:

a chamber having a space for containing concentrated seawater and seawater therein;

a concentrated seawater port provided at a lower part of said chamber for supplying and discharging the concentrated seawater;

a seawater port provided at an upper part of said chamber for supplying and discharging the seawater;

a concentrated seawater distributor in communication with said concentrated seawater port and configured to distribute a flow of the concentrated seawater all over a horizontal plane of an interior of said chamber;

a seawater distributor in communication with said seawater port and configured to distribute a flow of the seawater all over the horizontal plane of the interior of said chamber; and a connecting member for connecting said concentrated seawater distributor and said seawater distributor;

wherein the concentrated seawater and the seawater introduced into said chamber are brought into direct contact with each other all over the horizontal plane of the interior of said chamber to exchange pressure energy between the concentrated seawater and the seawater;

wherein said concentrated seawater distributor and said seawater distributor are horizontally arranged, said concentrated seawater distributor comprising a pipe having a plurality of holes arranged so as to face a lowest part of an inner surface of said chamber, and said seawater distributor comprising a pipe having a plurality of holes arranged so as to face a highest part of the inner surface of said chamber;

wherein, in each of said concentrated seawater distributor and said seawater distributor, said plurality of holes is configured to penetrate a wall of said pipe into a hollow portion of said pipe; and wherein each of connecting portions in said connecting member for connecting said concentrated seawater distributor and said seawater distributor has a substantially triangular cross-section in a vicinity of said concentrated seawater distributor or said seawater distributor.

5. An energy exchange chamber for exchanging pressure energy between concentrated seawater discharged from a reverse-osmosis membrane-separation apparatus and a part of seawater to be treated by the reverse-osmosis membrane separation apparatus in a seawater desalination system for producing fresh water from the seawater by supplying the seawater to the reverse-osmosis membrane-separation apparatus to separate the seawater into fresh water and concentrated seawater, said energy exchange chamber comprising:

a chamber having a space for containing concentrated seawater and seawater therein;

a concentrated seawater port provided at a lower part of said chamber for supplying and discharging the concentrated seawater;

a seawater port provided at an upper part of said chamber for supplying and discharging the seawater;

a concentrated seawater distributor in communication with said concentrated seawater port and configured to distribute a flow of the concentrated seawater all over a horizontal plane of an interior of said chamber;

a seawater distributor in communication with said seawater port and configured to distribute a flow of the seawater all over the horizontal plane of the interior of said chamber; and wherein the concentrated seawater and the seawater introduced into said chamber are brought into direct contact with each other all over the horizontal plane of the interior of said chamber to exchange pressure energy between the concentrated seawater and the seawater;

wherein said concentrated seawater distributor and said seawater distributor are horizontally arranged, said concentrated seawater distributor comprising a pipe having a plurality of holes arranged so as to face a lowest part of an inner surface of said chamber, and said seawater distributor comprising a pipe having a plurality of holes arranged so as to face a highest part of the inner surface of said chamber;

wherein, in each of said concentrated seawater distributor and said seawater distributor, said plurality of holes is configured to penetrate a wall of said pipe into a hollow portion of said pipe; and wherein two perforated plates are provided on respective sides of said plurality of holes of one of said concentrated seawater distributor and said seawater distributor so as to interpose said plurality of holes of said one of said concentrated seawater distributor and said seawater distributor between said two perforated plates in a position where said one of said concentrated seawater distributor and said seawater distributor faces the inner surface of said chamber, and said two perforated plates connect the inner surface of said chamber and said one of said concentrated seawater distributor and said seawater distributor.

6. A seawater desalination system for producing fresh water from seawater by supplying the seawater to a reverse-osmosis membrane-separation apparatus to separate the seawater into fresh water and concentrated seawater, said seawater desalination system comprising:

an energy exchange chamber according to claim 1 for exchanging pressure energy between the concentrated seawater discharged from said reverse-osmosis membrane-separation apparatus and a part of the seawater to be treated by said reverse-osmosis membrane-separation apparatus.

7. The energy exchange chamber according to claim 1, wherein said plurality of holes of said concentrated seawater distributor is located on a perimeter of said pipe of said concentrated seawater distributor and said plurality of holes of said seawater distributor is located on a perimeter of said pipe of said seawater distributor.

8. The energy exchange chamber according to claim 1, wherein said pipe of said concentrated seawater distributor and said pipe of said seawater distributor are parallel to said chamber.

\* \* \* \* \*